(12) United States Patent
Kwon et al.

(10) Patent No.: US 9,516,592 B2
(45) Date of Patent: Dec. 6, 2016

(54) APPARATUS AND METHOD FOR CONTROLLING TRANSMISSION SCHEDULE FOR BUFFERED DATA IN WIRELESS LAN, AND TERMINAL FOR RECEIVING BUFFERED DATA BASED ON TRANSMISSION SCHEDULE IN WIRELESS LAN

(71) Applicant: Electronics and Telecommunications Research Institute, Daejeon (KR)

(72) Inventors: Hyoung Jin Kwon, Daejeon (KR); Jae Seung Lee, Daejeon (KR); Min Ho Cheong, Daejeon (KR); Hee Jung Yu, Daejeon (KR); Sok Kyu Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 37 days.

(21) Appl. No.: 14/407,385

(22) PCT Filed: Jun. 13, 2013

(86) PCT No.: PCT/KR2013/005223
§ 371 (c)(1),
(2) Date: Dec. 11, 2014

(87) PCT Pub. No.: WO2013/187706
PCT Pub. Date: Dec. 19, 2013

(65) Prior Publication Data
US 2015/0181521 A1    Jun. 25, 2015

(30) Foreign Application Priority Data

Jun. 13, 2012  (KR) .................. 10-2012-0063152
Jun. 12, 2013  (KR) .................. 10-2013-0067266

(51) Int. Cl.
*H04W 52/02* (2009.01)
*H04W 84/12* (2009.01)

(52) U.S. Cl.
CPC ..... *H04W 52/0216* (2013.01); *H04W 52/0219* (2013.01); *H04W 84/12* (2013.01); *Y02B 60/50* (2013.01)

(58) Field of Classification Search
CPC ............................................. H04W 52/0216
See application file for complete search history.

(56) References Cited

U.S. PATENT DOCUMENTS

| 7,274,929 B1 * | 9/2007 | Banginwar ....... | H04W 52/0258 455/418 |
| 8,660,548 B1 * | 2/2014 | Lambert ........... | H04W 52/0206 455/418 |
| 9,137,823 B1 * | 9/2015 | Liu ..................... | H04W 74/006 |
| 2007/0286121 A1 * | 12/2007 | Kolakowski ...... | H04L 29/06027 370/329 |
| 2012/0127920 A1 * | 5/2012 | Kobayashi ........... | H04W 4/001 370/315 |

FOREIGN PATENT DOCUMENTS

| KR | 10-2008-0075144 A | 8/2008 |
| KR | 10-2009-0100698 A | 9/2009 |
| KR | 10-2011-0118753 A | 11/2011 |
| KR | 10-2012-0016985 A | 2/2012 |
| WO | WO 2011/149285 A2 | 12/2011 |

OTHER PUBLICATIONS

Kim, Hyu-Dae et al. "A New Power-Saving mechanism for WLAN Broadcast/Multicast services", In: IEEE 63$^{rd}$ Annual Vehicular Technology Conference, May 10, 2006, pp. 7-11, vol. 1.
International Search Report for PCT/KR2013/005223 filed on Jun. 13, 2013.

* cited by examiner

Primary Examiner — Brian D Nguyen
Assistant Examiner — Toan Nguyen

(57) ABSTRACT

Disclosed is a technology that enables an access point, configured to manage a network, to control a transmission schedule of buffered data and enables a terminal to obtain information associated with the transmission schedule in a wireless local area network (WLAN) environment. An apparatus for controlling a transmission schedule of buffered data in a WLAN according to an embodiment may group terminals based on at least one of a service characteristic and a traffic characteristic of each of the terminals, assign group information to each of the grouped groups to wake up in a different time, and transmit at least one of delivery traffic indication map (DTIM) information and the buffered data based on the assigned group information.

19 Claims, 5 Drawing Sheets

APPARATUS AND METHOD FOR CONTROLLING TRANSMISSION SCHEDULE FOR BUFFERED DATA IN WIRELESS LAN, AND TERMINAL FOR RECEIVING BUFFERED DATA BASED ON TRANSMISSION SCHEDULE IN WIRELESS LAN

TECHNICAL FIELD

The following embodiments relate to a technology that enables an access point, configured to manage a network, to control a schedule for transmitting buffered data to a terminal and enables the terminal to obtain the scheduling information in a wireless local area network (WLAN) environment.

BACKGROUND ART

In a power save (PS) mode of a wireless local area network (WLAN) environment, when a frame to be transmitted to terminals, for example, stations (STAs) is buffered, an access point (AP) may periodically apply, to a traffic indication map (TIM), information indicating whether a buffered frame is present for each terminal, may insert the TIM into a beacon and then transmit the beacon. The TIM may include a bitmap. A single bit of the TIM corresponds to a single STA and corresponds to an association identifier (AID) that is mapped to an STA.

When buffered data to be transmitted to each STA is present, the AP may set, to "1" in the TIM, a bit corresponding to an STA to which the buffered frame is to be transmitted. An STA that is in a PS mode status needs to wake up in order to verify the TIM of the beacon.

When the buffered frame is verified from the TIM, an STA transmits a Power Save Poll (PS-Poll) frame or a trigger frame in order to obtain the buffered frame. However, when the number of buffered frames is large, many STAs may access a channel for a relatively short duration of time and thus, a collision may occur between the STAs.

For example, the TIM may include 2008 bits and indicate whether a buffered frame is present with respect to a maximum of 2007 STAs. Hundreds of bits may be set to "1" in the TIM. Additionally, when considering a sensor node, at least 6000 STAs may be associated with the AP.

Accordingly, there is a need for research on a technology that may minimize a collision between many STAs during a channel access process and also minimize an amount of power used by the STAs.

DISCLOSURE OF INVENTION

Technical Goals

One or more embodiments provide an apparatus and method that may group stations (STAs) and change a wakeup interval in which STAs belonging to a single group wake up to be different for each group based on various service or traffic characteristics.

One or more embodiments also provide a method that may divide a group into a plurality of subgroups, and enables STAs belonging to each subgroup to be aware of a transmission of a delivery traffic indication map (DTIM) based on information associated with an interval and an offset, when a scale of the group including STAs with the same interval is large.

Technical Solutions

According to an aspect of one or more embodiments, there is provided an apparatus for controlling a transmission schedule of buffered data in a wireless local area network (WLAN), the apparatus including: a grouping unit to group terminals based on at least one of a service characteristic and a traffic characteristic of each of the terminals; a group information assigner to assign group information to each of the grouped groups to wake up in a different time; and a transmitter to transmit at least one of group delivery traffic indication map (DTIM) information and the buffered data based on the assigned group information.

The grouping unit may group the terminals based on an association ID (AID) associated with a traffic indication map (TIM) indicating whether a buffered frame is present at an access point.

The grouping unit may group again terminals included in a grouped group into subgroups each including a predetermined number of terminals or less.

The group information assigner may include: a transmission interval determiner to determine a transmission interval of a group DTIM to be different between groups, the group DTIM indicating whether buffered data corresponding to a terminal belonging to a grouped group is present; an identifier (ID) generator to generate a group ID for identifying the grouped group; a group counter to inform a transmission time of the group DTIM by setting a count value in interaction with the transmission interval of the group DTIM determined by the transmission interval determiner; and an offset counter to inform a transmission time of a group DTIM of a subgroup by setting an offset value to the subgroup of the grouped group.

The group information may include the transmission interval of the group DTIM, the group ID, a counter ID and a current count value of the group counter, and the offset value of the offset counter.

The count value of the group counter may be determined based on the transmission interval of the group DTIM.

The offset value of the offset counter may be determined based on a transmission interval of a beacon transmitted by the transmitter.

The transmitter may transmit the assigned group information to the grouped groups.

The transmitter may insert, into a beacon, a group DTIM descriptor element that is updated every transmission interval after the group information is assigned to a group, and thereby transmit the beacon.

The group DTIM descriptor element may include a count value decreasing by each "1" per transmission interval of the group DTIM and an offset value increasing by each "1" per transmission interval of the beacon when the count value becomes "0". The transmitter may transmit group DTIM information of a group corresponding to the offset value of "0" when the count value becomes "0", and the transmitter may transmit group DTIM information of a group corresponding to the increased offset value when the offset value increases per transmission interval of the beacon after the count value becomes "0".

According to another aspect of one or more embodiments, there is provided a terminal for receiving buffered data based on a transmission schedule in a WLAN, the terminal including: a receiver to receive, from an access point, a beacon including group information and a group DTIM descriptor element; a calculator to calculate a transmission point in time of a group DTIM of a group to which the terminal belongs by comparing the group information and the group DTIM descriptor element updated per transmission interval of the beacon; and a requesting unit to wake up based on the calculated transmission point in time and to request the access point for the buffered data.

The group information may include a transmission interval of the group DTIM, a group identifier (ID), a counter ID and a current count value of a group counter, and an offset value of an offset counter.

The group DTIM descriptor element may include a count value decreasing by each "1" per transmission interval of the group DTIM and an offset value increasing by each "1" per transmission interval of the beacon when the count value becomes "0".

The calculator may include: an identifying unit to identify the group to which the terminal belongs, based on the group ID; a comparator to compare a transmission interval of the group DTIM and a count value of the group DTIM descriptor element with respect to the identified terminal, and to compare the offset value of the offset counter and an offset value of the group DTIM descriptor element; and an estimator to estimate the transmission point in time of the group DTIM based on the comparison result.

The terminal may further include a transmitter to transmit at least one of a service characteristic and a traffic characteristic of each of the terminal to the access point.

The transmitter may transmit, to the access point, a trigger frame or a power save poll (PS-Poll) frame requesting the buffered data, and the receiver may receive the buffered data in response to the PS-Poll frame or the trigger frame.

According to still another aspect of one or more embodiments, there is provided a method of controlling a transmission schedule of buffered data in a WLAN, the method including: grouping terminals based on at least one of a service characteristic and a traffic characteristic of each of the terminals; assigning group information to each of the grouped groups to wake up in a different time; and transmitting at least one of group DTIM information and the buffered data based on the assigned group information.

The grouping may include grouping again terminals included in a grouped group into subgroups each including a predetermined number of terminals or less.

The assigning may include: determining a transmission interval of a group DTIM to be different between groups, the group DTIM indicating whether buffered data corresponding to a terminal belonging to a grouped group is present; generating a group ID for identifying the grouped group; informing a transmission time of the group DTIM by setting a count value in interaction with the determined transmission interval of the group DTIM; and informing a transmission time of a group DTIM of a subgroup by setting an offset value to the subgroup of the grouped group.

The transmitting may include transmitting the assigned group information to the grouped groups.

Effects of the Invention

According to embodiments, an apparatus for controlling a transmission schedule of buffered data in a wireless local area network (WLAN) may group terminals, for example, stations (STAs), and provide information associated with a transmission interval of a delivery traffic indication map (DTIM) by applying a different interval or a different interval and offset to each group, thereby enabling the STAs to wake up in different times and to obtain the buffered data. Also, a collision occurring during a channel access process may be decreased, thereby enhancing a power saving effect of an STA and the overall network performance.

Also, according to embodiments, an STA may verify a transmission schedule of a DTIM of a group to which the STA belongs even by listening to a predetermined beacon, instead of using a transmission interval of a DTIM of the STA. Accordingly, even though an error occurs in the transmission schedule of the DTIM, restoration is possible.

BEST MODE FOR CARRYING OUT THE INVENTION

Figure 1:
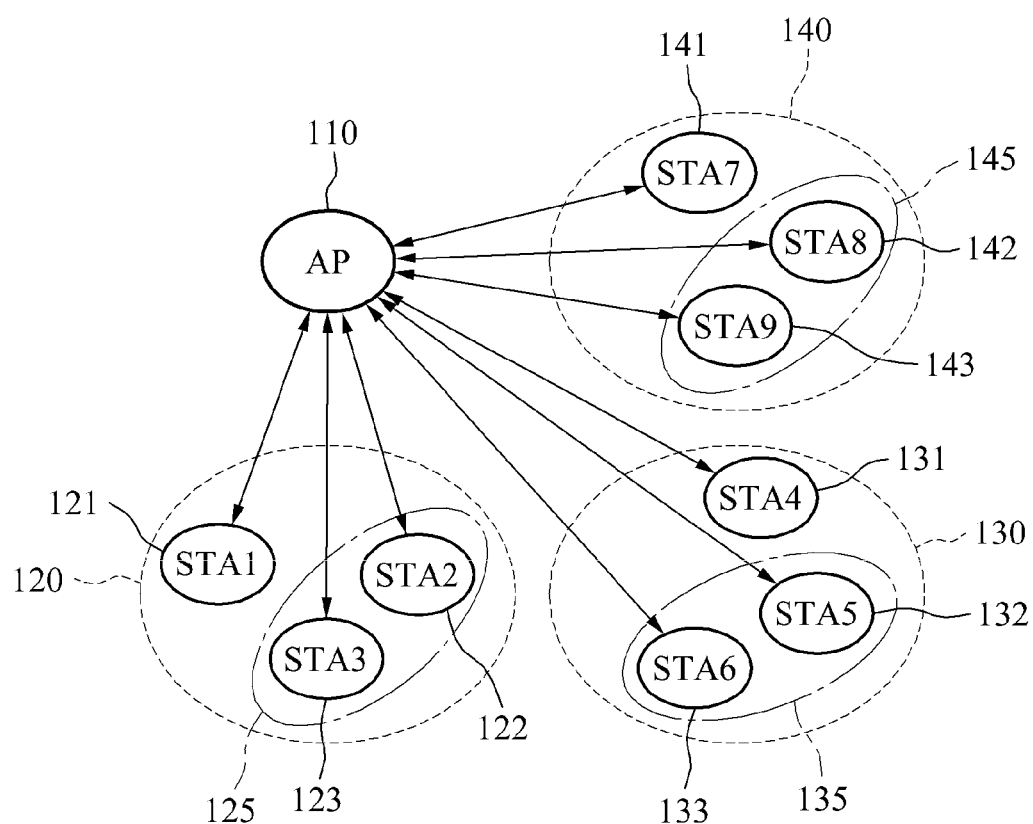
FIG. 1 illustrates a wireless local area network (WLAN) environment including an access point (AP) and a plurality of terminals according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

Hereinafter, embodiments of the present invention will be described with reference to the accompanying drawings.

FIG. 1 illustrates a wireless local area network (WLAN) environment including an access point (AP) and a plurality of terminals according to an embodiment of the present invention.

Referring to FIG. 1, an AP 110 may transmit, to terminals, for example, STA1, STA2, STA3, STA4, STA5, STA6, STA7, STA8, and STA9, a traffic indication map (TIM) based on a group unit. Here, the TIM indicates whether buffered data is present.

In an infrastructure mode of a WLAN, the AP 110 may buffer a frame for terminals, for example, STA1, STA2, STA3, STA4, STA5, STA6, STA7, STA8, and STA9, which are in a sleep status in a power save (PS) mode.

The AP 110 may receive information associated with a service characteristic or a traffic characteristic of each terminal from each of the terminals, for example, STA1, STA2, STA3, STA4, STA5, STA6, STA7, STA8, and STA9.

Information associated with the traffic characteristic may be Traffic Class (TCLAS) information used in an Institute of Electrical and Electronics Engineers (IEEE) 802.11e standard. Information associated with the service characteristic may be access category (AC) information of an Enhanced Distributed Channel Access (EDCA). Alternatively, information associated with the service characteristic or the traffic characteristic may be newly defined based on an application.

Information associated with the service characteristic or the traffic characteristic may be included in an Information Element (IE) or a field defined in a standard. A group DTIM request element format may be newly defined and information associated with the service characteristic or the traffic characteristic may be defined as a sub-element therein and thereby be transferred. Also, a group delivery traffic indication map (DTIM) request frame may be newly defined and information associated with the service characteristic or the traffic characteristic may be defined and be transferred. Also, information associated with the service characteristic or the traffic characteristic may be inserted as an element of an association request frame or a re-association request frame and thereby be transferred in the case of association or re-association.

Also, a traffic interval may be included as traffic characteristic information. The traffic interval may be included in a group DTIM delivery interval field in the group DTIM request element format.

The AP 110 may group terminals having a similar service characteristic or traffic characteristic. The AP 110 may group, into a single group 120, STA1 121, STA2 122, and STA3 123 having a similar service characteristic or traffic characteristic. Also, the AP 110 may group, into a single group 130, STA4 131, STA5 132, and STA6 133 having a similar service characteristic or traffic characteristic. Also, the AP 110 may group, into a single group 140, STA7 141, STA8 142, and STA9 143 having a similar service characteristic or traffic characteristic.

The AP 110 may broadcast information associated with DTIM transmission intervals having different values to the group 120, the group 130, and the group 140, so that terminals belonging to the respective groups 120, 130, and 140 may wake up in a different time and may perform a channel access for each group. Terminals belonging to each group may obtain information associated with a group DTIM transmission interval and wake up based thereon and may receive group DTIM information corresponding to each group. The group DTIM information indicates, using a bit value, whether buffered data is present with respect to terminals corresponding to each group. When buffered data is determined to be present based on the group DTIM information, a terminal may request the AP 110 for the buffered data.

Also, when the predetermined number of terminals included in the group 120 is greater than a predetermined reference, a subgroup 125 may be generated to meet the predetermined reference. The predetermined reference may be determined based on a type of a channel supported by the AP 110, the number of channels, and a channel status. Also, the predetermined reference may be variously defined based on a service characteristic or a traffic characteristic.

For example, when the predetermined reference is "two" terminals, STA2 122 and STA3 123 may be included in the subgroup 125. As another example, STA1 121 and STA2 122 may be included in the subgroup 125, or STA1 121 and STA3 123 may be included in the subgroup 125. Similarly, even in the case of the groups 130 and 140, when the number of terminals included in the respective groups 130 and 140 is greater than a predetermined reference, the subgroups 130 and 140 may be generated to meet the predetermined reference. STA5 132 and STA6 133 may be included in a subgroup 135. STA8 142 and STA9 143 may be included in a subgroup 145.

As another example, when the group 120 includes a plurality of subgroups 125, a transmission interval of a group DTIM may be set to be identical and an offset value may be set to be different with respect to a plurality of subgroups. Terminals belonging to each of subgroups may receive group information from the AP 110 through a beacon, and may wake up at a point in time corresponding to a transmission interval of a group DTIM and an offset value of a subgroup to which terminals belong, and then receive group DTIM information. Accordingly, even within the same group, terminals belonging to different subgroups may wake up at different point in times and perform a channel access. Accordingly, an occurrence probability of a collision by a channel access between terminals may decrease and thus, an amount of energy used by a terminal may also decrease.

A frame transferred to terminals, for example, STA1, STA2, STA3, STA4, STA5, STA6, STA7, STA8, and STA9, may be classified into a broadcast frame, a multicast frame, and a unicast frame.

The broadcast frame and the multicast frame may not be transmitted with respect to all of the beacons, and may be transmitted based on a group DTIM interval longer than a beacon interval. In the unicast frame, group DTIM information may be transmitted based on a beacon interval or a listen interval.

The AP 110 may group terminals based on an association identifier (AID) assigned to each of the terminals, for example, STA1, STA2, STA3, STA4, STA5, STA6, STA7, STA8, and STA9. For example, terminals of which top two most significant bits (MSBs) of the AID are identical may be grouped into a single group.

The AP 110 may reduce the number of terminals configured to perform a channel access in order to transmit a PS-Poll frame or a trigger frame by fragmenting a DTIM for each group and thereby transmitting group DTIM information.

A transmission interval of a group DTIM may differ for each group, and the transmission interval of the group DTIM may be set based on a service characteristic or a traffic characteristic of a group.

The AP 110 may set and thereby inform a transmission interval of a group DTIM based on information received from the terminals, for example, STA1, STA2, STA3, STA4, STA5, STA6, STA7, STA8, and STA9. When a characteristic requested by a terminal is not applied to the transmission interval of the group DTIM, the AP 110 may make a negotiation with the terminal by defining and informing a status.

In the case of generating information associated with a grouped group, a transmission interval of a group DTIM set for each group, and a subgroup, the AP 110 may generate group information including an offset value set for the subgroup and the like, and may assign the generated group information to terminals.

For example, group information may include a group DTIM delivery interval indicating a transmission interval of a group DTIM, a group DTIM ID for identifying each group, a group DTIM counter informing a point in time when group DTIM information is to be transmitted, and an offset counter.

The group DTIM counter may include a current count field indicating a counter ID for identifying a counter and a current count value in a beacon. A current count value of a count field may be adjusted based on a transmission interval of a group DTIM.

The offset counter indicates an offset value of an offset counter currently included in a beacon. The offset value may be adjusted based on a beacon interval. Alternatively, an offset counter interval field indicating a unit for adjusting the offset value may be added. A value of the offset counter interval field may be determined based on integer multiples of the beacon interval.

For example, a group having the same group DTIM transmission interval may share the same group DTIM counter. Subgroups within the same group may be identified using different offset values of the offset counter. For example, an offset value "0" may be assigned to a first subgroup and a different offset value may be assigned to a second subgroup.

When group information is assigned to terminals, the AP 110 may insert a newly defined group DTIM descriptor element into each beacon and thereby transmit group DTIM information to the terminals.

The group DTIM descriptor element may include a group DTIM counter and an offset counter. The group DTIM counter may be identified using a counter ID. Each counter may have a value corresponding to a different group DTIM transmission interval.

A value of a current count field may decrease by each "1" per group DTIM transmission interval. When a value of a current count field is "0, the AP 110 may transmit, to a corresponding group, buffered data or a buffered frame, for example, a buffered group addressed frame, of a group having an offset value of "0".

An offset counter and a group DTIM counter may constitute a pair. When a count value of the group DTIM counter configured as a pair becomes "0", the offset counter may be triggered and the offset value may increase based on a predetermined offset value adjustment unit. For example, when a beacon interval is set as the offset value adjustment unit, the offset value may increase by each "1" per beacon interval.

When the count value of the group DTIM counter is not "0", the offset counter may not operate. Therefore, only when a count value of the group DTIM counter is "0", an offset counter field may be dynamically inserted into a beacon frame in order to decrease the number of bits of the beacon frame.

The AP 110 may transmit the group DTIM descriptor element and may transmit, to a corresponding group, buffered data of a group that matches the offset value.

When transmission of buffered data to groups having an offset value is completed, the AP 110 may reset the group DTIM counter and the offset counter.

Also, the group DTIM descriptor element may include a group DTIM ID. The group DTIM ID may be used to identify each of grouped groups, may also be used to identify a group for which buffered data is present, and may also be used to identify each group when a plurality of groups shares a single group DTIM counter.

The terminals, for example, STA1, STA2, STA3, STA4, STA5, STA6, STA7, STA8, and STA9, may predict a transmission point in time of group DTIM information of a group to which a corresponding terminal belongs by comparing a value of an offset counter and a value of a group DTIM counter of a group DTIM descriptor element, included in a received beacon, with a count value, a count value, an offset value, and a transmission interval of a group DTIM, assigned by the AP 110. Therefore, when a terminal listens to a predetermined single beacon, the terminals may acquire a transmission point in time of group DTIM information of a group which the corresponding terminals belong. Also, the terminals may verify whether buffered data is present based on a group DTIM ID.

Figure 2:
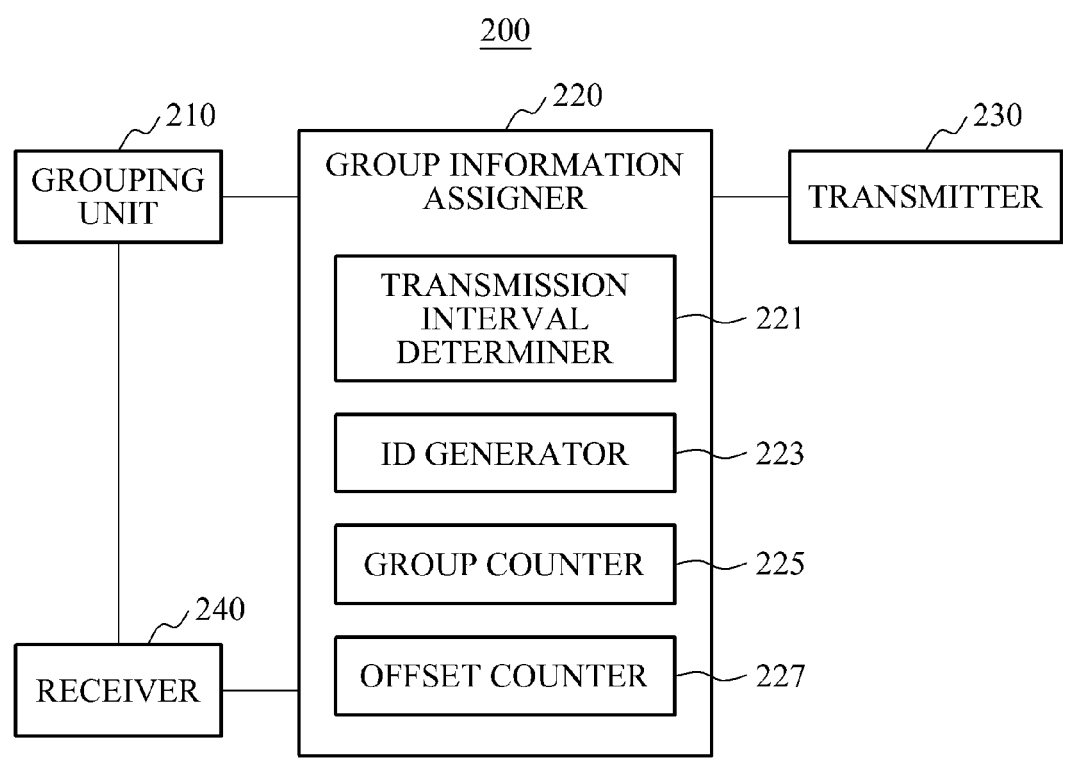
FIG. 2 is a block diagram illustrating an apparatus for controlling a transmission schedule of buffered data in a WLAN according to an embodiment of the present invention.

FIG. 2 is a block diagram illustrating an apparatus for controlling a transmission schedule of buffered data in a WLAN according to an embodiment of the present invention.

Referring to FIG. 2, an apparatus 200 for controlling a transmission schedule of buffered data in a WLAN according to an embodiment may include a grouping unit 210, a group information assigner 220, a transmitter 230, and a receiver 240. The apparatus 200 for controlling a transmission schedule of buffered data in a WLAN corresponds to an AP in a WLAN environment.

The receiver 240 may receive a service characteristic and a traffic characteristic from terminals. Information associated with the traffic characteristic may be TCLAS information used in an IEEE 802.11e standard. Information associated with the service characteristic may be EDCA information.

The grouping unit 210 may group terminals based on at least one of the service characteristic and the traffic characteristic. The grouping unit 210 may group terminals having a similar service characteristic and may also group terminals having a similar traffic characteristic. Also, the grouping unit 210 may group terminals having a similar service characteristic and traffic characteristic.

The grouping unit 210 may group terminals based on an AID associated with a TIM indicating whether a buffered frame is present in an AP.

The grouping unit 210 may group again terminals included in a grouped group into subgroups each including a predetermined number of terminals or less. When a collision occurrence probability is determined to be high due to many terminals included in a group performing a channel access to a group, the grouping unit 21 may segment the group into subgroups.

The group information assigner 220 may assign group information for each grouped group to wake up in a different time.

The group information may include a transmission interval of a group DTIM, a group ID, a counter ID and a current count value of a group counter, and an offset value of an offset counter.

For example, the group information assigner 220 may include a transmission interval determiner 221, an ID generator 223, a group counter 225, and an offset counter 227.

The transmission interval determiner 221 may determine a transmission interval of a group DTIM to be different for each group. The group DTIM may indicates whether buffered data corresponding to a terminal belonging to a grouped group is present. Since the transmission interval of the group DTIM is determined to be different for each group, each group may wake up in a different time and receive the buffered data from an AP.

The ID generator 223 may generate a group ID for identifying a grouped group. The AP may identify the grouped group using the group ID, and a terminal may identify a group to which the terminal belongs using the group ID. The AP may transmit a group DTIM to an awakened group using the group ID.

The group counter 225 may inform the transmission interval of the group DTIM by setting a count value in interaction with the transmission interval of the group DTIM determined by the transmission interval determiner 221.

The count value of the group counter 225 may be determined based on the transmission interval of the group DTIM.

The offset counter 227 may inform a transmission interval of a group DTIM of a subgroup by setting an offset value to the subgroup of the grouped group. In the same group, the same count value of the group counter may be assigned to the terminals. When a plurality of subgroups is present, the plurality of subgroups may be distinguished from each other using the offset value.

The offset value of the offset counter 227 may be determined based on a transmission interval of a beacon transmitted from the transmitter 230. Alternatively, the offset value may be adjusted based on integer multiples of the transmission interval of the beacon.

The transmitter 230 may transmit at least one of group DTIM information and buffered data based on group information assigned for each group. The group DTIM information includes a group DTIM indicating whether buffered data is present for each group. In response to transmission of the group DTIM, the receiver 240 may receive a PS-Poll frame or a trigger frame from a terminal. In response to the PS-Poll frame or the trigger frame, the transmitter 230 may transmit the buffered data.

The transmitter 230 may transmit the assigned group information to grouped groups. The transmitter 230 may include group information in a beacon and thereby transmit the group information to groups. For example, the transmitter 230 may transmit group information using a broadcast scheme or a multicast scheme. as another example, the transmitter 230 may transmit buffered data using a unicast scheme.

The transmitter 230 may insert, into a beacon, a group DTIM descriptor element that is updated per transmission interval of the beacon after group information is assigned to a group, and thereby transmit the beacon.

The group DTIM descriptor element may include a count value of the group counter 225 decreasing by each "1" per transmission interval of the group DTIM and an offset value of the offset counter 227 increasing by each "1" per transmission interval of the beacon when the count value becomes "0".

When the count value becomes "0", the transmitter 230 may transmit group DTIM information of a group having the offset value of "0".

When the offset value increases per transmission interval of the beacon after the count value becomes "0", the transmitter 230 may transmit group DTIM information of a group corresponding to the increased offset value.

Figure 3:
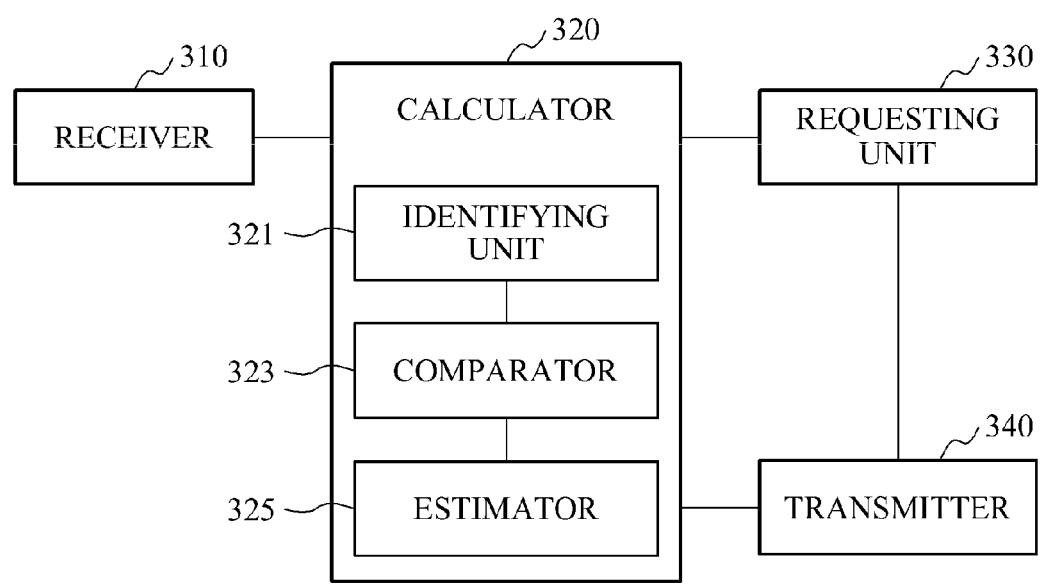
FIG. 3 is a block diagram illustrating a terminal for receiving buffered data based on a transmission schedule in a WLAN according to an embodiment of the present invention.

FIG. 3 is a block diagram illustrating a terminal 300 for receiving buffered data based on a transmission schedule in a WLAN according to an embodiment of the present invention.

Referring to FIG. 3, the terminal 300 for receiving buffered data based on a transmission schedule in a WLAN may include a receiver 310, a calculator 320, a requesting unit 330, and a transmitter 340.

The receiver 310 may receive, from an AP, a beacon including group information and a group DTIM descriptor element.

The group information may include a transmission interval of a group DTIM, a group ID, a counter ID and a current count value of a group counter, and an offset value of an offset counter.

The group DTIM descriptor element may include a count value decreasing by each "1" per transmission interval of a group DTIM and an offset value increasing by each "1" per transmission interval of the beacon when the count value becomes "0".

The calculator 320 may calculate a transmission point in time of a group DTIM of a group to which the terminal 300 belongs by comparing group information and a group DTIM descriptor element updated per transmission interval of the beacon.

For example, the calculator 320 may include an identifying unit 321, a comparator 323, and an estimator 325.

The identifying unit 321 may identify a group to which the terminal 300 belongs, based on a group ID received by the receiver 310.

With respect to the identified terminal 300, the comparator 323 may compare a transmission interval of the group DTIM and a count value of the group DTIM descriptor element, and may compare the offset value of the offset counter and an offset value of the group DTIM descriptor element.

The estimator 325 may estimate the transmission point in time of the group DTIM based on the comparison result. For example, the estimator 325 may estimate the transmission point in time of the group DTIM, based on a difference between the count value of the group counter assigned by applying the transmission interval of the group DTIM and the count value of the group DTIM descriptor element.

Also, when the assigned value of the group counter and the count value of the DTIM descriptor element are identical, the estimator 325 may estimate the transmission point in time of the group DTIM based on the difference between the offset value of the offset counter and the offset value of the group DTIM descriptor element.

The requesting unit 330 may wake up based on the calculated transmission point in time and may request the AP for buffered data based on the received group DTIM information.

The transmitter 340 may transmit at least one of the service characteristic and the traffic characteristic of the terminal 300 to the AP.

When buffered data is verified to be present in the terminal 300 based on the group DTIM information, the transmitter 340 may transmit, to the AP, a trigger frame or a PS-Poll frame requesting the buffered data. The receiver 310 may receive the buffered data in response to the PS-Poll frame or the trigger frame.

Figure 4:
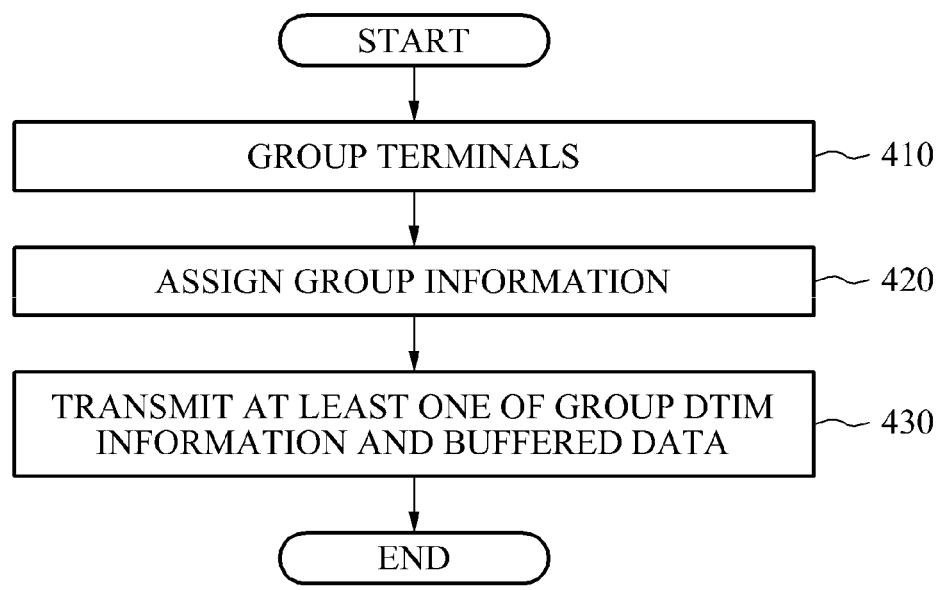
FIG. 4 is a flowchart illustrating a method of controlling a transmission schedule of buffered data in a WLAN according to an embodiment of the present invention.

FIG. 4 is a flowchart illustrating a method of controlling a transmission schedule of buffered data in a WLAN according to an embodiment of the present invention.

In operation 410, a communication apparatus according to an embodiment may terminals based on at least one of a service characteristic and a traffic characteristic of each of the terminals. Here, the communication apparatus may correspond to an AP.

The communication apparatus may group again terminals included in a grouped group into subgroups each including a predetermined number of terminals or less. A different transmission interval of a group DTIM may be set for each group. The same time transmission interval of a group DTIM and a different offset value may be set for each subgroup.

In operation 420, the communication apparatus may assign group information to each grouped group to wake up in a different time. The group information may include a transmission interval of a group DTIM, a group ID, a counter ID and a current count value of a group counter, and an offset value of an offset counter.

The communication apparatus may determine a transmission interval of a group DTIM to be different between groups. Here, the group DTIM indicates whether buffered data corresponding to a terminal belonging to a grouped group is present.

The communication apparatus may generate a group ID for identifying a grouped group. The communication apparatus may inform a terminal of a transmission interval of a group DTIM by setting a count value of a group counter in interaction with the determined transmission interval of the group DTIM. The communication apparatus may inform each subgroup of a different transmission interval of a group DTIM by setting an offset value of an offset counter with respect to a subgroup of the grouped subgroup.

In operation 430, the communication apparatus may transmit at least one of group DTIM information and buffered data based on group information assigned for each group.

The communication apparatus may transmit the assigned group information to grouped groups.

Figure 5:
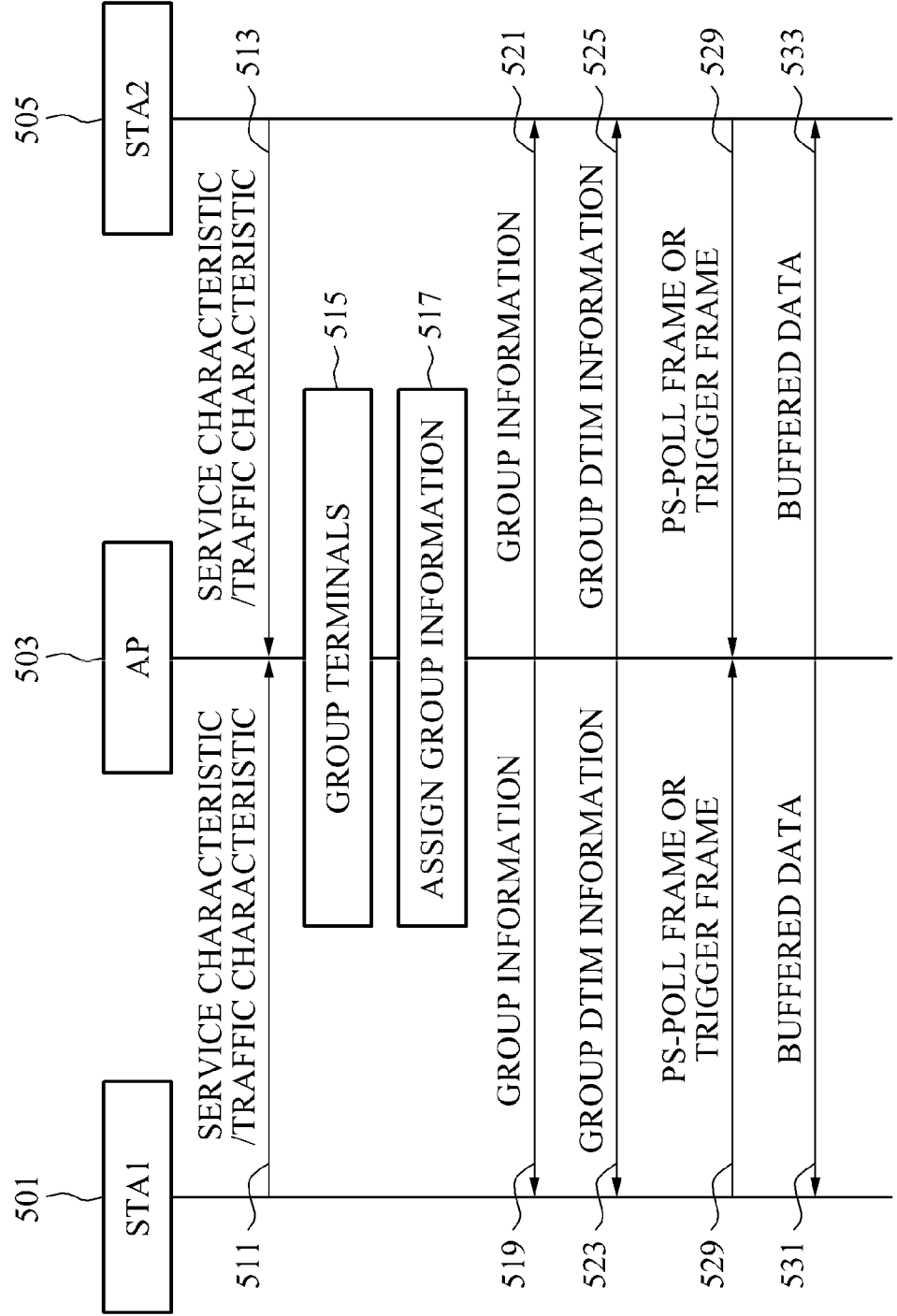
FIG. 5 is a flowchart illustrating a method of controlling a transmission schedule of buffered data in a WLAN according to another embodiment of the present invention

FIG. 5 is a flowchart illustrating a method of controlling a transmission schedule of buffered data in a WLAN according to another embodiment of the present invention.

In operation 511, an AP 503 may receive information associated with a service characteristic and a traffic characteristic from STA1 501. In operation 513, the AP 503 may receive information associated with a service characteristic and a traffic characteristic from STA2 505.

In operation 515, the AP 503 may group STA1 501 and STA2 505 based on the service characteristic and the traffic characteristic. STA1 501 and STA2 505 correspond to the simplest configuration used in order to represent a plurality of terminals. At least two terminals may be grouped into the same group based on a similar service characteristic or a similar traffic characteristic.

In operation 517, the AP 503 may assign group information to the group. The group information may include a transmission interval of a group DTIM, a counter ID and a current count value of a group counter, and an offset value of an offset counter.

In operation 519, the AP 503 may transmit group information to a group to which STA1 501 belongs. In operation 521, the AP 503 may transmit group information to a group to which STA2 505 belongs. The group of STA1 501 and the group of STA2 505 may be identical and may be different.

In operation 523, the AP 503 may transmit group DTIM information to the group of STA1 501, based on the determined transmission interval of the group DTIM. In operation 525, the AP 503 may transmit group DTIM information to the group of STA2 505 based on the determined transmission interval of the group DTIM. When the group of STA1 501 and the group of STA2 505 are identical, STA1 501 and STA2 505 may receive the same transmission interval of the group DTIM. Conversely, when the group of STA1 501 and the group of STA2 505 are different, STA1 501 and STA2 505 may receive a different transmission interval of the group DTIM.

In operation 527, when buffered data is determined to be present through group DTIM information, STA1 501 may transmit a PS-Poll frame or a trigger frame to the AP 503. The PS-Poll frame or the trigger frame may include a message requesting buffered data. In operation 529, when buffered data is determined to be present through group DTIM information, STA2 505 may transmit a PS-Poll frame or a trigger frame to the AP 503.

In operation 531, in response to the PS-Poll frame or the trigger frame, the AP 503 may transmit the buffered data to STA1 501. In operation 533, in response to the PS-Poll frame or the trigger frame, the AP 503 may transmit the buffered data to STA2 505.

The embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. An apparatus for controlling a transmission schedule of buffered data in a wireless local area network (WLAN), the apparatus comprising:
   a grouping unit to group terminals based on at least one of a service characteristic and a traffic characteristic of each of the terminals;
   a group information assigner to assign group information to each of the grouped groups to wake up in a different time; and
   a transmitter to transmit at least one of group delivery traffic indication map (DTIM) information and the buffered data based on the assigned group information,
   wherein the transmitter inserts, into a beacon, a group DTIM descriptor element, and transmits the beacon, and
   wherein the group DTIM descriptor element comprises a count value of a group counter decreasing per transmission interval of a group DTIM and an offset value of an offset counter increasing per transmission interval of the beacon when the count value becomes a preset value.

2. The apparatus of claim 1, wherein the grouping unit groups the terminals based on an association ID (AID) associated with a traffic indication map (TIM) indicating whether a buffered frame is present at an access point.

3. The apparatus of claim 1, wherein the grouping unit groups terminals included in a grouped group into subgroups each including a predetermined number of terminals or less.

4. The apparatus of claim 1, wherein the group information assigner comprises:
   a transmission interval determiner to determine a transmission interval of a group DTIM to be different between groups, the group DTIM indicating whether buffered data corresponding to a terminal belonging to a grouped group is present;
   an identifier (ID) generator to generate a group ID for identifying the grouped group;
   the group counter to inform a transmission time of the group DTIM by setting a count value in interaction with the transmission interval of the group DTIM determined by the transmission interval determiner; and
   the offset counter to inform a transmission time of a group DTIM of a subgroup by setting an offset value to the subgroup of the grouped group.

5. The apparatus of claim 4, wherein the group information comprises the transmission interval of the group DTIM, the group ID, a counter ID and a current count value of the group counter, and the offset value of the offset counter.

6. The apparatus of claim 4, wherein the count value of the group counter is determined based on the transmission interval of the group DTIM.

7. The apparatus of claim 4, wherein the offset value of the offset counter is determined based on a transmission interval of a beacon transmitted by the transmitter.

8. The apparatus of claim 1, wherein the transmitter transmits the assigned group information to the grouped groups.

9. The apparatus of claim 1, wherein the group DTIM descriptor element is updated per transmission interval after the group information is assigned to a group.

10. The apparatus of claim 1, wherein
the transmitter transmits group DTIM information of a group corresponding to the offset value of "0" when the count value becomes "0", and
the transmitter transmits group DTIM information of a group corresponding to the increased offset value when the offset value increases per transmission interval of the beacon after the count value becomes "0".

11. A terminal for receiving buffered data based on a transmission schedule in a wireless local area network (WLAN), the terminal comprising:
a receiver to receive, from an access point, a beacon comprising group information and a group delivery traffic indication map (DTIM) descriptor element;
a calculator to calculate a transmission point in time of a group DTIM of a group to which the terminal belongs by comparing the group information and the group DTIM descriptor element updated per transmission interval of the beacon; and
a requesting unit to wake up based on the calculated transmission point in time and to request the access point for the buffered data,
wherein the group DTIM descriptor element comprises a count value of a group counter decreasing per transmission interval of the group DTIM and an offset value of an offset counter increasing per transmission interval of the beacon when the count value becomes a preset value.

12. The terminal of claim 11, wherein the group information comprises a transmission interval of the group DTIM, a group identifier (ID), a counter ID, and a current count value of the group counter, and an offset value of the offset counter.

13. The terminal of claim 11, wherein the calculator comprises:
an identifying unit to identify the group to which the terminal belongs, based on the group ID;
a comparator to compare a transmission interval of the group DTIM and a count value of the group DTIM descriptor element with respect to the identified terminal, and to compare the offset value of the offset counter and an offset value of the group DTIM descriptor element; and
an estimator to estimate the transmission point in time of the group DTIM based on the comparison result.

14. The terminal of claim 11, further comprising:
a transmitter to transmit at least one of a service characteristic and a traffic characteristic of the terminal to the access point.

15. The terminal of claim 14, wherein
the transmitter transmits, to the access point, a trigger frame or a power save poll (PS-Poll) frame requesting the buffered data, and
the receiver receives the buffered data in response to the PS-Poll frame or the trigger frame.

16. A method of controlling a transmission schedule of buffered data in a wireless local area network (WLAN), the method comprising:
grouping terminals based on at least one of a service characteristic and a traffic characteristic of each of the terminals;
assigning group information to each of the grouped groups to wake up in a different time; and
transmitting at least one of group delivery traffic indication map (DTIM) information and the buffered data based on the assigned group information,
wherein the transmitting further comprises inserting, into a beacon, a group DTIM descriptor element, and
wherein the group DTIM descriptor element comprises a count value decreasing per transmission interval of a group DTIM and an offset value increasing per transmission interval of the beacon when the count value becomes a preset value.

17. The method of claim 16, wherein the grouping further comprises grouping terminals included in a grouped group into subgroups each including a predetermined number of terminals or less.

18. The method of claim 16, wherein the assigning comprises:
determining a transmission interval of a group DTIM to be different between groups, the group DTIM indicating whether buffered data corresponding to a terminal belonging to a grouped group is present;
generating a group identifier (ID) for identifying the grouped group;
informing a transmission time of the group DTIM by setting a count value in interaction with the determined transmission interval of the group DTIM; and
informing a transmission time of a group DTIM of a subgroup by setting an offset value to the subgroup of the grouped group.

19. The method of claim 18, wherein the transmitting comprises transmitting the assigned group information to the grouped groups.

* * * * *